(12) United States Patent
Li et al.

(10) Patent No.: US 10,069,292 B2
(45) Date of Patent: Sep. 4, 2018

(54) LEAKAGE CURRENT DETECTION DEVICE FOR APPLIANCES

(71) Applicant: Chengli Li, Suzhou (CN)

(72) Inventors: Chengli Li, Suzhou (CN); Guolan Yue, Suzhou (CN); Wei Zhang, Suzhou (CN)

(73) Assignee: Chengli Li, Suzhou (CN)

( * ) Notice: Subject to any disclaimer, the term of this patent is extended or adjusted under 35 U.S.C. 154(b) by 436 days.

(21) Appl. No.: 15/080,077

(22) Filed: Mar. 24, 2016

(65) Prior Publication Data
US 2017/0222425 A1    Aug. 3, 2017

(30) Foreign Application Priority Data

Feb. 2, 2016  (CN) .......................... 2016 1 0074697
Feb. 2, 2016  (CN) ...................... 2016 2 0106965 U (51) Int. Cl.
    *H02H 3/16*  (2006.01)
    *H02H 3/33*  (2006.01)
    *H02H 3/02*  (2006.01)
(52) U.S. Cl.
    CPC ..................................... *H02H 3/02* (2013.01)
(58) Field of Classification Search
    CPC ............. H02H 3/16; H02H 3/162; H02H 3/33
    USPC ......................................................... 361/93.1
    See application file for complete search history.

(56) References Cited

U.S. PATENT DOCUMENTS

| | | | |
|---|---|---|---|
| 8,405,939 B2 * | 3/2013 | Haines ...................... | H02H 9/00 361/42 |
| 8,760,824 B2 * | 6/2014 | Armstrong ......... | G01R 31/3272 361/42 |
| 9,857,448 B1 * | 1/2018 | Li .......................... | G01R 31/025 |
| 9,948,087 B2 * | 4/2018 | Haines ................ | G01R 31/3277 |
| 9,978,553 B2 * | 5/2018 | Tomimbang ........... | H01H 83/20 |

* cited by examiner

*Primary Examiner* — Dharti Patel
(74) *Attorney, Agent, or Firm* — Chen Yoshimura LLP (57) ABSTRACT

A leakage current detection device connected between a power source and a load, which includes a self-testing or leakage current detection selection trigger unit, for selecting a leakage current detection mode or a self-testing mode; a self-testing unit, for periodically generating a simulated leakage current signal in the self-testing mode; and a leakage current detection unit, for detecting a leakage current signal in the leakage current detection mode and detecting the simulated leakage current signal in the self-testing mode. The selection trigger unit further causes the power source to be disconnected from the load when a leakage current signal is detected, and sends a self-testing result to the self-testing unit depending on whether the leakage current detection unit detects the simulated leakage current signal. The self-testing unit displays an indication of the self-testing result.

14 Claims, 5 Drawing Sheets

LEAKAGE CURRENT DETECTION DEVICE FOR APPLIANCES

BACKGROUND OF THE INVENTION

Field of the Invention

This invention relates to electrical circuits for appliances, and in particular, it relates to a leakage current detection device.

Description of Related Art

With the wide use of electrical appliances, safety in their use is important. Leakage current detection devices with circuit interrupter functions are widely used. However, in practice, not all users follow the advice of testing the device before use, so often it cannot be ensured that the leakage current circuit interrupter will function normally before it is put to use. Further, even if the user tested the leakage current circuit interrupter device before use, during use, the protection function of the circuit interrupter may be lost (take the example of an electrical water heater with a leakage current detection and interruption plug, the plug may lose its protection function during use if some parts are damaged). In such a situation, when the appliance has a current leak, the leakage current circuit interrupter cannot provide a leakage warning signal or cut off the power, which can cause harm to the user.

Further, many current leakage current circuit interrupters that employ relays cannot meet the requirement of automatically energizing the device when connected.

SUMMARY

Therefore, there is a need for a leakage current detection device employing a relay that has leakage current detection function and self-testing function.

Accordingly, embodiments of the present invention provide a leakage current detection device and a power connector device having leakage current detection function. The leakage current detection device has leakage current detection function and self-testing function.

To achieve these and/or other objects, in one aspect, the present invention provides a leakage current detection device connected between a power source and a load, which includes: a self-testing or leakage current detection selection trigger unit, for selecting a leakage current detection mode or a self-testing mode; a self-testing unit, for periodically generating a simulated leakage current signal in the self-testing mode; and a leakage current detection unit, for detecting a leakage current signal in the leakage current detection mode and detecting the simulated leakage current signal in the self-testing mode; wherein the selection trigger unit further causes the power source to be disconnected from the load when a leakage current signal is detected, and sends a self-testing result to the self-testing unit depending on whether the leakage current detection unit detects the simulated leakage current signal, and wherein the self-testing unit displays an indication of the self-testing result.

This way, the leakage current detection device can achieve both leakage current detection and self-testing functions.

In one embodiment, the selection trigger unit includes a first silicon controlled rectifier (SCR), wherein the selection trigger unit selects the leakage current detection mode by controlling the first SCR to be conductive, and selects the self-testing mode by controlling the first SCR to be non-conductive.

In one embodiment, the selection trigger unit includes a fourth transistor and a fifth transistor, wherein the selection trigger unit selects the leakage current detection mode by controlling the fourth transistor to be non-conductive and controlling the fifth transistor to be conductive, and selects the self-testing mode by controlling the fourth transistor to be conductive and controlling the fifth transistor to be non-conductive.

In one embodiment, the selection trigger unit includes a fourth transistor and a photo-coupler, wherein the selection trigger unit selects the leakage current detection mode by controlling the fourth transistor to be non-conductive and controlling the photo-coupler to be conductive, and selects the self-testing mode by controlling the fourth transistor to be conductive and controlling the photo-coupler to be non-conductive.

By using a photo-coupler, the reliability of the circuit is improved.

In one embodiment, the selection trigger unit further includes a second SCR, wherein in the leakage current detection mode, the selection trigger unit disconnects the power source from the load by controlling the second SCR to be conductive, and in the self-testing mode, the selection trigger unit sends the self-testing result to the self-testing unit by controlling the conductive state of the second SCR.

In one embodiment, the selection trigger unit further includes a first fault indicator unit for indicating a leakage current fault condition.

This way, leakage current fault condition can be clearly indicated to the user.

In one embodiment, the self-testing unit includes: a reference voltage generator sub-unit for generating a reference voltage signal; a periodic signal generator sub-unit for generating a period voltage signal, the period voltage signal being higher than the reference voltage signal during some part of a period and lower than the reference voltage signal during some other part of the period; a comparator, for comparing the reference voltage signal and the periodic voltage signal; and a first transistor, for generating the simulated leakage current signal based on a comparison result of the comparator.

This way, the self-testing unit can periodically generates the simulated leakage current.

In one embodiment, the self-testing unit further includes a second fault indicator unit for indicating a malfunction condition of the leakage current detection device.

This way, malfunction conditions of the device can be clearly indicated to the user.

In one embodiment, the leakage current detection unit includes: detection coils for detecting the leakage current signal or the simulated leakage current signal; and a processor, for sending a detection result of the detection coils to the selection trigger unit.

In one embodiment, the leakage current detection device further includes: a power supply unit, for supplying power to the selection trigger unit, the self-testing unit, and the leakage current detection unit; and a relay holding unit including a relay switch, the relay holding unit keeping the relay switch closed to connect the power source to the load after the leakage current detection device is energized.

In one embodiment, the relay holding unit includes a reset switch, a second transistor, and a third transistor, wherein when the reset switch is closed, the second transistor and the third transistor are conductive to keep the relay switch closed.

In one embodiment, the relay holding unit includes a relay capacitor, a second transistor, and a third transistor, wherein after the leakage current detection device is connected to the power source, the relay capacitor keeps the second transistor and the third transistor conductive to keep the relay switch closed.

This way, the leakage current detection device can be automatically energized after the device is connected to the power source, without having to manual depressed the reset switch.

In one embodiment, the relay holding unit includes an auxiliary switch linked to the relay switch.

This way, the number of electronic components is reduced, improving the life and reliability of the device.

In another aspect, the inventor provides a power connection device including the above leakage current detection device.

In summary, leakage current detection device uses the relay holding unit to maintain connection between the power source and the load, uses leakage current detection unit to monitor the operation of the power lines, uses the self-testing unit to monitor the operation of the various components of the device, and uses the self-testing or leakage current detection selection trigger unit to finally process the leakage current signals. This design significantly improves the protection function of the leakage current detection device.

BRIEF DESCRIPTION OF THE DRAWINGS

Embodiments of the invention are described with reference to the following drawings.

DETAILED DESCRIPTION OF PREFERRED EMBODIMENTS

Embodiments of the present invention are described with reference to the drawings. It will be apparent to those skilled in the art that various modification and variations can be made in the leakage current detection devices of the present invention without departing from the spirit or scope of the invention. Thus, it is intended that the present invention cover modifications and variations that come within the scope of the appended claims and their equivalents.

Figure 1:
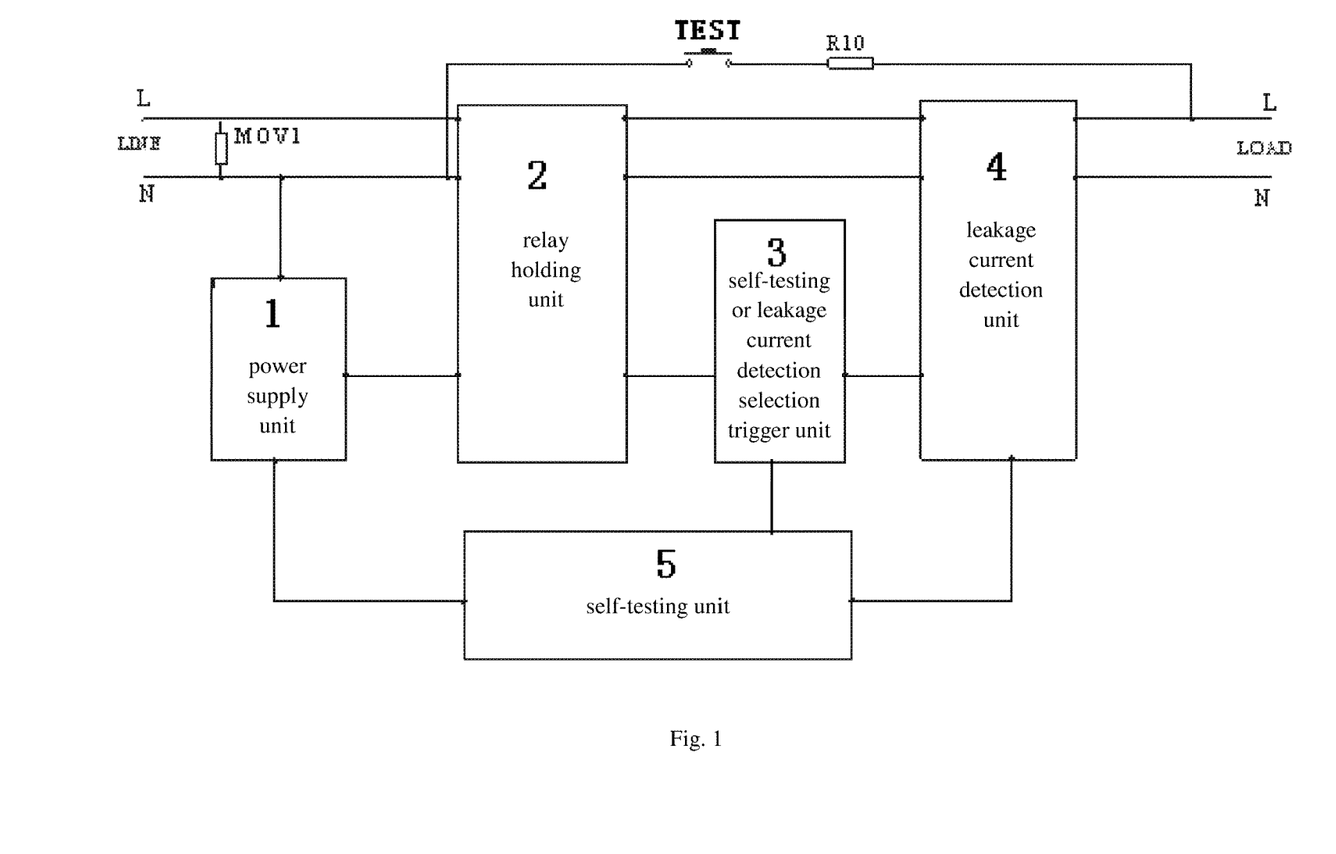
FIG. 1 is a logic block diagram of a leakage current detection device according to embodiments of the present invention.

FIG. 1 is a logic block diagram of a leakage current detection device according to embodiments of the present invention.

As shown in FIG. 1, the leakage current detection device includes a self-testing or leakage current detection selection trigger unit 3, a leakage current detection unit 4, and a self-testing unit 5 connected to the power lines ("L" and "N") between the power source (the line side or "LINE") and the load side ("LOAD"), in the manner shown in FIG. 1.

The selection trigger unit 3 is used to select a leakage current detection mode or a self-testing mode. When the leakage current signal is a self-testing signal, it causes the leakage current detection unit to perform self-testing; and when the leakage current signal is an actual leakage current signal, it causes the power to be disconnected because line side and load side.

The leakage current detection unit 4 is used to detect a leakage current on the power lines. When the leakage current is greater than a threshold leakage current value, it drives a switch to disconnect the power or performs self-testing.

The self-testing unit 5 is used to detect the operating status of the selection trigger unit 3 and the leakage current detection unit 4.

The leakage current detection device further includes a power supply unit 1 and a relay holding unit 2.

The power supply unit 1 is used to supply power for various components of the leakage current detection device.

The relay holding unit 2 is used to keep a relay actuated (i.e. the relay switch closed) to connect power to the load side after the device is energized.

Figure 2:
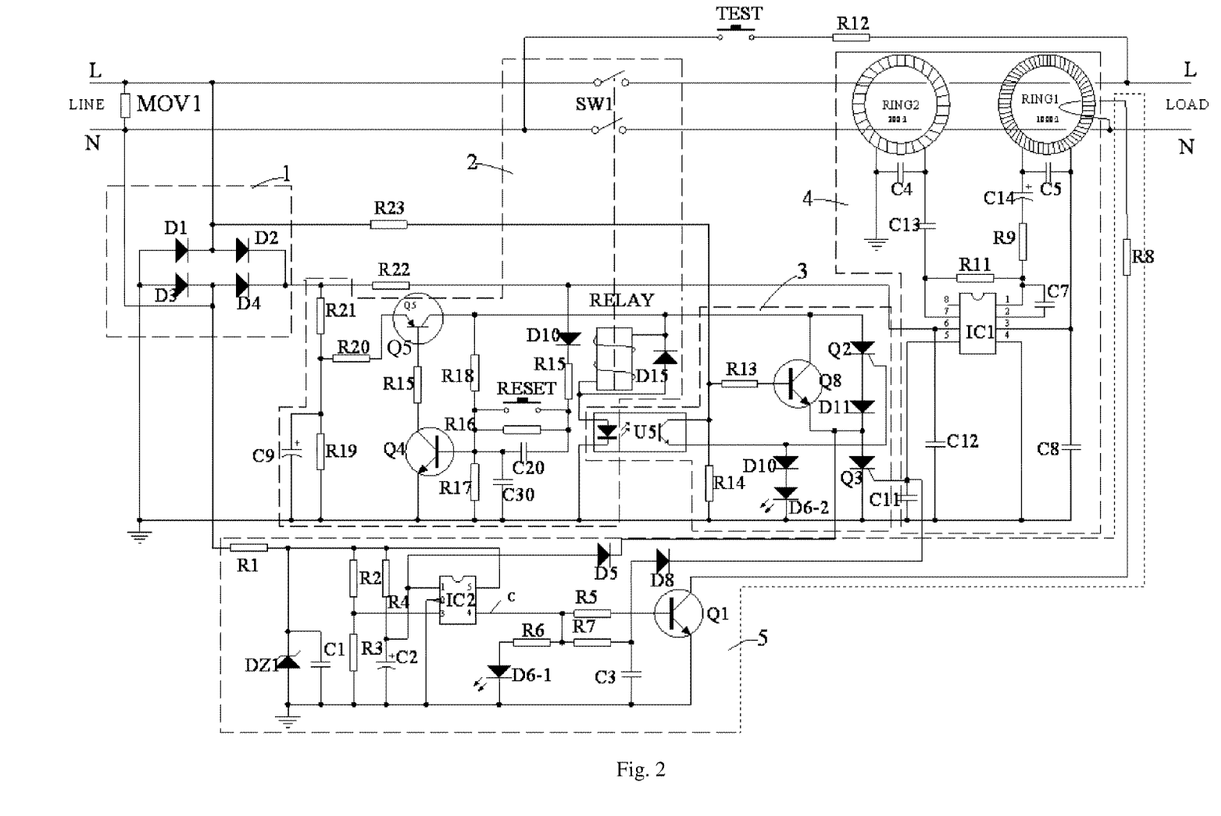
FIG. 2 is a circuit diagram of a leakage current detection device according to a first embodiment of the present invention.

FIG. 2 is a circuit diagram of a leakage current detection device according to a first embodiment of the present invention.

As shown in FIG. 2, the relay holding unit 2 includes at least: reset switch RESET, second transistor Q4, third transistor Q5, resistor R18, relay coil and relay switch SW1, connected in the manner shown in FIG. 2.

The self-testing or leakage current detection selection trigger unit 3 includes at least: first SCR (silicon controller rectifier) Q2, second SCR Q3, fifth transistor Q8, and first fault indicator unit D6-2, connected in the manner shown in FIG. 2.

The leakage current detection unit 4 includes at least: processor IC1 and detection coils, connected in the manner shown in FIG. 2.

The self-testing unit 5 includes at least: compactor IC2, second fault indicator unit D6-1, first transistor Q1, multiple resistors R1 to R8 and multiple capacitors C1 to C3, connected in the manner shown in FIG. 2.

The operation of the various units when detecting leakage current is described below.

When detecting leakage current, after the reset switch RESET is closed, the second transistor Q4 becomes conductive (on); in turn the third transistor Q5 becomes conductive, and maintains the conductive state (i.e. self-latched) via resistor R18. At this time, the relay coil is powered normally, and the relay switch SW1 is closed to connect the load side to the line side, and the first fault indicator unit D6-2 is continuously lit.

When the selection trigger unit 3 selects the leakage current detection mode, the first SCR Q2 becomes conductive.

The detection coils of the leakage current detection unit 4 detect whether the L and N lines of the power lines have a leakage current. For the self-testing unit 5, because the selection trigger unit 3 is selecting the leakage current detection mode, the self-testing unit 5 does not operate.

At this time, if no leakage current is present, the processor IC1 of the leakage current detection unit 4 outputs a low voltage level at its pin 5, causing the second SCR Q3 to be non-conductive (off). As a result, the path Q2—D11—Q3 is non-conductive, so that the relay coil is not shorted to lose its voltage, and power is supplied to the load side normally.

On the other hand, if at this time a leakage current at or above the threshold value is present, then the detection coils of the leakage current detection unit 4 detect the leakage current and output an induced voltage to the pins 1 and 3 of the processor IC1. This causes the pin 5 to output a high voltage level, causing the second SCR Q3 to become conductive. Because the selection trigger unit 3 is selecting the leakage current detection mode, the path Q2—D11—Q3 is conductive. This causes the relay coil to be shorted and loses its voltage, so that the relay switch SW1 is open, disconnecting the power to the load side. The first fault indicator unit D6-2 is also extinguished.

The operation of the various units when performing self-test is described below.

When performing self-test, after the reset switch RESET is closed, the second transistor Q4 becomes conductive; in turn the third transistor Q5 becomes conductive, and maintains the conductive state (i.e. self-latched) via resistor R18. At this time, the relay coil is powered normally, and the relay switch SW1 is closed to connect the load side to the line side, and the first fault indicator unit D6-2 is continuously lit.

When the selection trigger unit 3 selects the self-test mode, the first SCR Q2 becomes non-conductive.

The detection coils of the leakage current detection unit 4 detect whether the L and N lines of the power lines have a simulated leakage current. The self-testing unit 5 periodically generates a simulated leakage current signal.

The self-testing unit 5 includes a periodic signal generator sub-unit, which includes serially connected resistor R4 and capacitor C2. The periodic signal generator sub-unit is coupled to the input end (positive) of the comparator IC2. Resistor R4 and capacitor C2 on the comparator IC2 are coupled to the N line via resistor R1, which charges capacitor C2 via resistor R4.

The positive input of the comparator IC2 is coupled between resistor R4 and capacitor C2, to receive the voltage signal on capacitor C2. The negative input of the comparator IC2 is coupled to a reference voltage generator sub-unit formed by resistors R2 and R3, to receive the reference voltage signal. Both the periodic signal generator sub-unit and the reference voltage generator sub-unit receive the voltage signal on the N line.

When the voltage on capacitor C2 (i.e. the positive input of the comparator IC2) is higher than the voltage on resistor R3 (i.e. the negative input of the comparator IC2), the output of the comparator IC2 flips, so that the voltage at point C is a high voltage level. As a result, conductive current paths C—R5—Q1, C—R6—D6-1 and C—R7—C3 are formed, and the second fault indicator D6-1 is lit.

Point C is coupled via resistor R5 to the base of first transistor Q1. Therefore, once point C outputs a high voltage level, the first transistor Q1 becomes conductive, and forms a conductive current path N—R8—Q1—D1—L. This introduces a predetermined current $I_C$ to the detection coils of the leakage current detection unit 4 (the predetermined current $I_C$ is greater than the threshold leakage current value $I_f$).

The detection coils receive the leakage current signal $I_C$ and generate an induced voltage, which causes the pin 5 of the processor IC1 to output a high voltage level, causing the second SCR Q3 to become conductive. At this time, capacitor C2 discharges via diode D5 and the second SCR Q3, so that the voltage at the positive input of the comparator IC2 drops rapidly.

When the positive input voltage of the comparator IC2 drops below its negative input voltage, the output of the comparator IC2 flips, so that the voltage at point C is a low voltage level. Thus, the first transistor Q1 is turned off and the second fault indicator unit D6-1 is extinguished. At this time, if the detection coils do not detect a leakage current, then the pin 5 of the processor IC1 and the control gate of the second SCR Q3 are at a low voltage level; the charge on capacitor C2 is discharged, so its voltage drops, and becomes lower than a threshold voltage required for keeping the second SCR Q3 and diode D5 conductive. While capacitor C2 is discharging, because the first SCR Q2 is non-conductive, and the path Q2—D11—Q3 is non-conductive, so the conductive state of the second SCR Q3 cannot be maintained, thereby stopping the process after the self-testing is complete.

The self-testing unit continuously repeats the above process.

Situation 1: When the leakage current detection device is functioning properly, after the reset switch RESET is closed, the load is powered, and the first fault indicator unit D6-2 should be continuously lit. When the device is in normal use in the powered state, during self-test, the second fault indicator unit D6-1 should flash periodically. If the test switch TEST is depressed (closed), a conductive current path L—R12—N is formed, generating a leakage current; as a result, the relay coil path is open, hence the relay switch SW1 is open, so the load side is disconnected from the line side, and the first fault indicator unit D6-2 is extinguished. After multiple testing, this will indicate that the leakage current detection device is functioning properly.

Situation 2: When the device is powered and reset, if the first fault indicator unit D6-2 is not continuously lit or the second fault indicator unit D6-1 does not flash periodically, then they indicate that the device is not functioning properly and should not be used.

If the leakage current detection unit 4 is not functioning properly (i.e., capacitor C5 has a short, processor IC2 is broken, etc.) and the leakage current protection function is lost, or if the predetermined threshold leakage current value $I_f$ increases causing the simulated leakage current $I_C$ generated by the self-testing unit 5 to be smaller than $I_f$, then, pin 5 of the processor IC1 outputs a low voltage level, so the second SCR Q3 is non-conductive (or, the second SCR Q3 may be broken, e.g. Q3 may be an open circuit or its trigger pin is shorted). As a result, the second fault indicator unit D6-1 will continuously lit, indicating to the user that the leakage current detection device should not be used.

If at this time the second SCR Q3, diodes D5 and D8 are functioning normally, then the comparator IC2 will charge capacitor C3 via resistor R7. When this voltage reaches a preset level, diode D8 and the second SCR Q3 become conductive; thus, comparator IC2 will continue to output a high voltage level, the first transistor Q1 continues to be conductive, and therefore the second SCR Q3 continues to be conductive. When the circuit switches from self-testing mode to the leakage current detection mode, the first SCR Q2 becomes conductive, and the path Q2—D11—Q3 becomes conductive; the relay coil is shorted and loses its voltage, causing relay switch SW1 to be open. This disconnects the load side from the line side, cutting off power to the connected appliance, to ensure safety of the user.

If the firs SCR Q2 is shorted, then when performing self-testing, a conductive current path Q2—D11—Q3 is formed, which causes the load side to be disconnected from the line side.

If the relay coil is short or open, so no current flows through the coil, then the relay switch SW1 which is coupled to the relay coil will be open.

If the photo-coupler is broken (e.g, the primary or the secondary stage being short or open), then the path L—R23—secondary stage of photo-coupler—D10—D6-2—N is open, so the first fault indicator unit D6-2 is extinguished.

If the emitter and collector of the third transistor Q5 are shorted, then after switching to the leakage current detection mode the conductive current path Q2—D11—Q3 is formed and maintained, and the relay switch SW1 is open.

If the emitter and collector of the second transistor Q4 are shorted, then after switching to the leakage current detection mode the conductive current path Q2—D11—Q3 is formed and maintained, and the relay switch SW1 is open.

Also, capacitor C20 determines an automatic energization function (i.e., after the device is connected to the power source, the relay switch SW1 automatically closes) or a manual energization function (i.e., depressing the reset switch RESET to close the relay switch SW1). I.e., when capacitor C20 is present, the device is automatically energized, while when C20 is not present, the device needs to be manually energizes.

For the self-testing or leakage current detection selection trigger unit 3, when the self-test signal is received, transistor Q8 and first SCR Q2 are non-conductive, and second SCR Q3 is conductive. When the actual leakage current signal is received, transistors Q8 and SCRs Q2 and Q3 are conductive.

Figure 3:
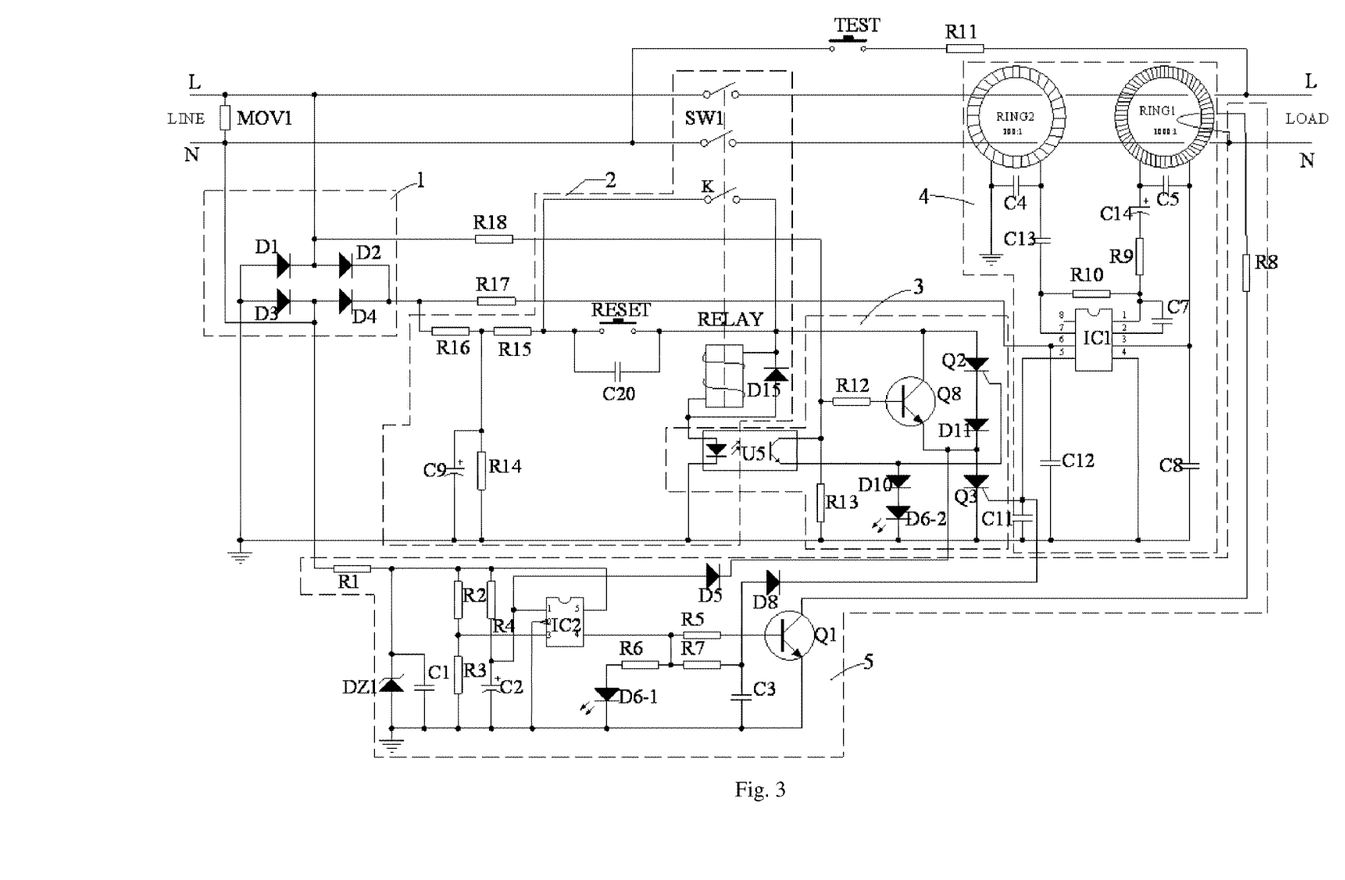
FIG. 3 is a circuit diagram of a leakage current detection device according to a second embodiment of the present invention.

FIG. 3 is a circuit diagram of a leakage current detection device according to a second embodiment of the present invention.

Compared to the embodiment of FIG. 2, in the embodiment of FIG. 3, the relay holding unit is replaced by an auxiliary switch linked to the relay switch. This reduces the use of electrical components and improves the life and reliability of the device.

Also, similar to the embodiment of FIG. 2, when the reset switch is closed, the relay is energized and actuated, and the auxiliary switch K and relay switch SW1 are closed; the relay is self-latched by the auxiliary switch K and operates normally, so the load side is connected to the line side.

In the embodiment of FIG. 3, the self-testing and leakage current detection functions as well as the normal and abnormal situations are similar to those in the embodiment of FIG. 2 and detailed descriptions are omitted here.

Figure 4:
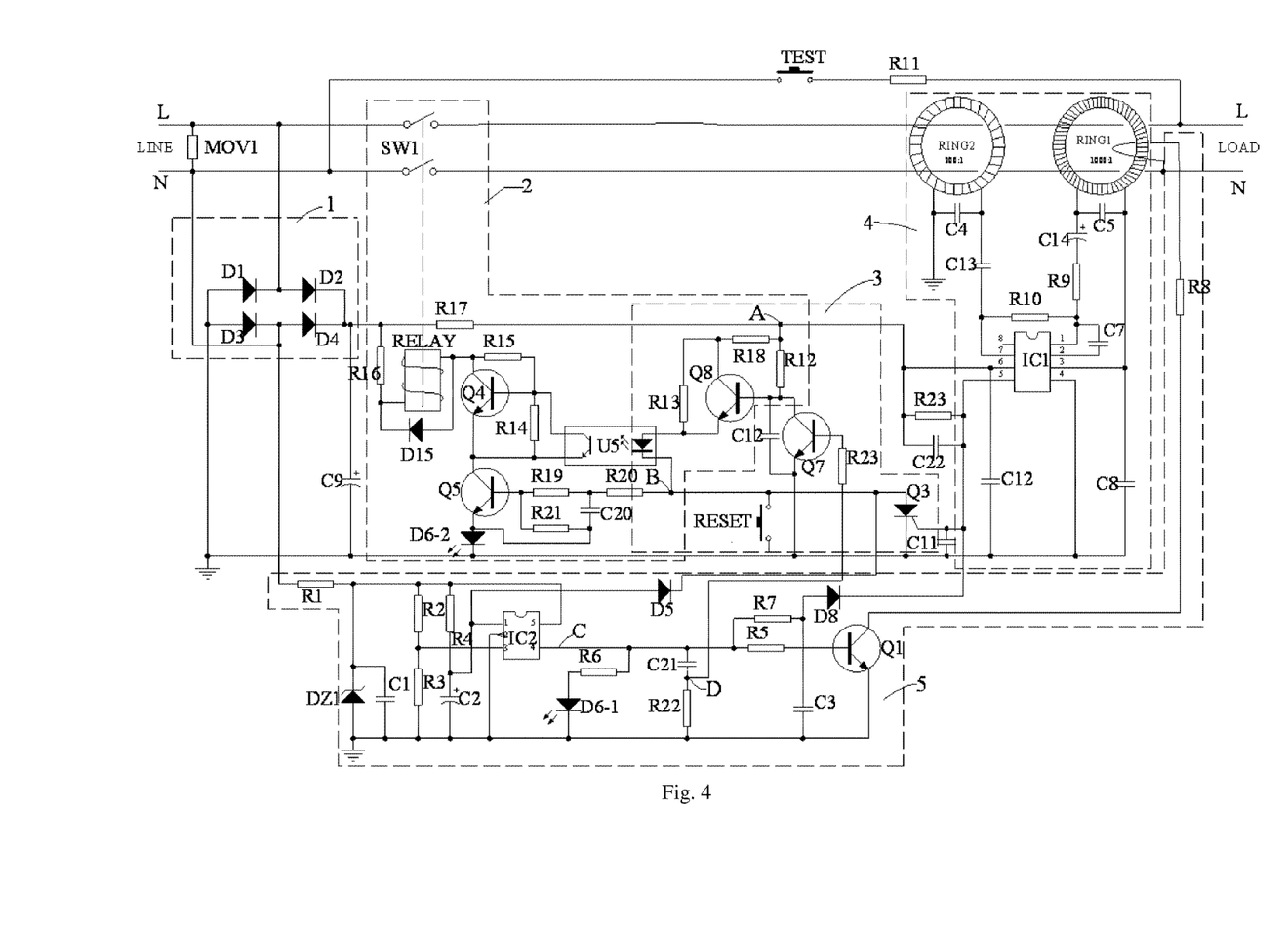
FIG. 4 is a circuit diagram of a leakage current detection device according to a third embodiment of the present invention.

FIG. 4 is a circuit diagram of a leakage current detection device according to a third embodiment of the present invention.

As shown in FIG. 4, the relay holding unit 2 includes at least: second transistor Q4, third transistor Q5, multiple resistors R18 to R20, relay coil, relay switch SW1, and first fault indicator unit D6-2, connected in the manner shown in FIG. 4.

The self-testing or leakage selection trigger unit 3 includes at least: fourth transistor Q7, second SCR Q3, fifth transistor Q8, reset switch RESET, and resistor R23, connected in the manner shown in FIG. 4.

The leakage current detection unit 4 includes at least: processor IC1 and detection coils, connected in the manner shown in FIG. 4.

The self-testing unit 5 includes at least: comparator IC2, second fault indicator unit D6-1, first transistor Q1, multiple resistors R1 to R8 and multiple capacitors C1 to C3, connected in the manner shown in FIG. 4.

Referring to FIG. 4, the operations of the selection trigger unit 3, leakage current detection unit 4 and self-testing unit 5 in leakage current detection and self-testing situations are described.

First, the operations of the various units when detecting a leakage current are described.

After the reset switch RESET is closed, a conductive current path A—R18—Q8—B—R20—R19—Q5—D6-2 is formed, transistors Q8, Q4 and Q5 are conductive, and the relay coil is powered normally. Thus, the relay switch SW1 closes to supply power to the load side, and the first fault indicator unit D6-2 is continuously lit.

The selection trigger unit 3 selects the leakage current detection mode, so the fifth transistor Q8 is conducive and the fourth transistor Q7 is non-conducive.

The detection coils of the leakage current detection unit 4 detect whether a leakage current is present on the power lines L, N.

At this time, if no leakage current is present, the processor IC1 outputs a low voltage level at its pin 5, causing the second SCR Q3 to be non-conductive. As a result, the relay coil operates normally (i.e. not shorted) and the load is powered normally.

On the other hand, if at this time a leakage current at or above the threshold value is present, then the detection coils of the leakage current detection unit 4 detect the leakage current and output an induced voltage to the pins 1 and 3 of the processor IC1. This causes the pin 5 to output a high voltage level, causing the second SCR Q3 to become conductive. Because the selection trigger unit 3 is selecting the leakage current detection mode, the path A—R18—Q8—B—Q3 is conductive and keeps the photo-coupler conductive. The voltage at point B drops rapidly, and transistors Q4 and Q5 become non-conducive, causing the power supply path to the relay coil to be open. As a result, the relay switch SW1 is open, disconnecting the power to the load side, and the first fault indicator unit D6-2 is extinguished.

The operation of the various units when performing self-test is described below.

After the reset switch RESET is closed, a conductive current path A—R18—Q8—B—R20—R19—Q5—D6-2 is formed, transistors Q8, Q4 and Q5 are conductive, and the relay coil is powered normally. Thus, power is supply to the load side normally, and the first fault indicator unit D6-2 is continuously lit.

The selection trigger unit 3 selects the self-testing mode, so the fourth transistor Q7 is conducive and the fifth transistor Q8 is non-conducive.

The detection coils of the leakage current detection unit 4 detect whether a leakage current is present on the power lines L, N.

The self-testing unit 5 periodically generates a simulated leakage current signal.

The self-testing unit 5 includes a periodic signal generator sub-unit, which includes serially connected resistor R4 and capacitor C2. The periodic signal generator sub-unit is coupled to the input end (positive) of the comparator IC2. Resistor R4 and capacitor C2 on the comparator IC2 are coupled to the N line via resistor R1, which charges capacitor C2 via resistor R4.

The positive input of the comparator IC2 is coupled between resistor R4 and capacitor C2, to receive the voltage signal on capacitor C2. The negative input of the comparator IC2 is coupled to a reference voltage generator sub-unit formed by resistors R2 and R3, to receive the reference voltage signal. Both the periodic signal generator sub-unit and the reference voltage generator sub-unit receive the voltage signal on the N line.

When the voltage on capacitor C2 (i.e. the positive input of the comparator IC2) is higher than the voltage on resistor R3 (i.e. the negative input of the comparator IC2), the output of the comparator IC2 flips, so that the voltage at point C is a high voltage level. As a result, conductive current paths D—R23—Q7, C—R5—Q1, C—R6—D6-1 and C—R7—C3 are formed, and the second fault indicator D6-1 is lit. Transistor Q7 is conductive and transistor Q8 is non-conductive. This way, the selection trigger unit 3 selects the self-testing mode.

Point C is coupled via resistor R5 to the base of first transistor Q1. Therefore, once point C outputs a high voltage level, the first transistor Q1 becomes conductive, and forms a conductive current path N—R8—Q1—D1—L. This introduces a predetermined current $I_C$ to the detection coils of the leakage current detection unit 4 (the predetermined current $I_C$ is greater than the threshold leakage current value $I_f$).

The detection coils receive the leakage current signal $I_C$ and generate an induced voltage, which causes the pin 5 of the processor IC1 to output a high voltage level, causing the second SCR Q3 to become conductive. At this time, capacitor C2 discharges via diode D5 and the second SCR Q3, so that the voltage at the positive input of the comparator IC2 drops rapidly.

When the positive input voltage of the comparator IC2 drops below its negative input voltage, the output of the IC2 flips, so that the voltage at point C is a low voltage level. Thus, the first transistor Q1 is turned off and the second fault indicator unit D6-1 is extinguished. At this time, if the detection coils do not detect a leakage current, then the pin 5 of the processor IC1 and the control gate of the second SCR Q3 are at a low voltage level; the charge on capacitor C2 is discharged, so its voltage drops, and becomes lower than a threshold voltage required for keeping the second SCR Q3 and diode D5 conductive. While capacitor C2 is discharging, the conductive current path A—R18—R13—B—Q3 is formed, so the conductive state of the second SCR Q3 cannot be maintained, thereby stopping the process after the self-testing. The self-testing unit continuously repeats the above process.

Situation 1: When the leakage current detection device is functioning properly, after the reset switch RESET is closed, the load is powered, and the first fault indicator unit D6-2 should be continuously lit. When the device is in normal use in the powered state, during self-test, the second fault indicator unit D6-1 should flash periodically. If the test switch TEST is depressed (closed), a conductive current path L—R11—N is formed, the relay coil path is open, hence the relay switch SW1 is open, so the load side is disconnected from the line side, and the first fault indicator unit D6-2 is extinguished. After multiple testing, this will indicate that the leakage current detection device is functioning properly.

Situation 2: When the device is powered and reset, if the first fault indicator unit D6-2 is not continuously lit or the second fault indicator unit D6-1 does not flash periodically, then they indicate that the device is not functioning properly and should not be used.

If the leakage current detection unit 4 is not functioning properly (i.e., capacitor C5 is short, processor IC1 is broken, etc.) and the leakage current protection function is lost, or if the predetermined threshold leakage current value $I_f$ increases causing the simulated leakage current $I_C$ generated by the self-testing unit 5 to be smaller than $I_f$, then, pin 5 of the processor IC1 outputs a low voltage level, so the second SCR Q3 is non-conductive (or, the second SCR Q3 may be broken, e.g. Q3 may be an open circuit or the trigger pin is shorted). As a result, the second fault indicator unit D6-1 will continuously lit, indicating to the user that the leakage current detection device should not be used.

If at this time the second SCR Q3, diodes D5 and D8 are functioning normally, then the comparator IC2 will charge capacitor C3 via resistor R7. When this voltage reaches a preset level, diode D8 and the second SCR Q3 become conductive; thus, comparator IC2 will continue to output a high voltage level, the first transistor Q1 continues to be conductive, and therefore the second SCR Q3 continues to be conductive. When the circuit switches from self-testing mode to the leakage current detection mode, the current path A—R18—Q8—B—Q3 becomes conductive; the photo-coupler is conductive, transistors Q4 and Q5 are non-conductive, and the current path for the relay coil is open, causing relay switch SW1 to be open. This disconnects the load side from the line side, cutting off power to the connected appliance, to ensure safety of the user.

If the relay coil is short or open, no current flows through the coil, then the relay switch SW1 which is linked to the relay coil will be open.

If the fifth transistor Q8 is broken (short or open), then transistors Q4 or Q5 are non-conductive when transistor Q3 is conductive during self-testing, and the current path for the relay coil becomes open.

If the fourth transistor Q7 is broken (short or open), then transistors Q4 or Q5 are non-conductive when transistor Q3 is conductive during self-testing, and the current path for the relay coil becomes open.

If the photo-coupler is broken (short or open), then at least one of transistors Q4 or Q5 is non-conductive when transistor Q3 is conductive during self-testing, and the current path for the relay coil becomes open.

If one of transistors Q4 and Q5 is broken (short or open), because Q4 and Q5 are coupled serially in the current path of the relay, when the power is disconnected in response to a fault, Q4 and Q5 are both turned off, so the malfunction of Q4 and Q5 will not affect the disconnection of power in response to a fault.

Also, capacitor C20 selects an automatic energization function (i.e., after the device is energized, the relay switch SW1 automatically closes) or a manual energization function (i.e., depressing the reset switch RESET to close the relay switch SW1).

For the self-testing or leakage current detection selection trigger unit 3, when the self-testing unit generates a self-test signal, transistor Q7 is conductive, transistor Q8 is non-conductive, and second SCR Q3 is conductive. When the actual leakage current signal is received, transistor Q7 is non-conductive, transistor Q8 is conductive, and second SCR Q3 is conductive.

Figure 5:
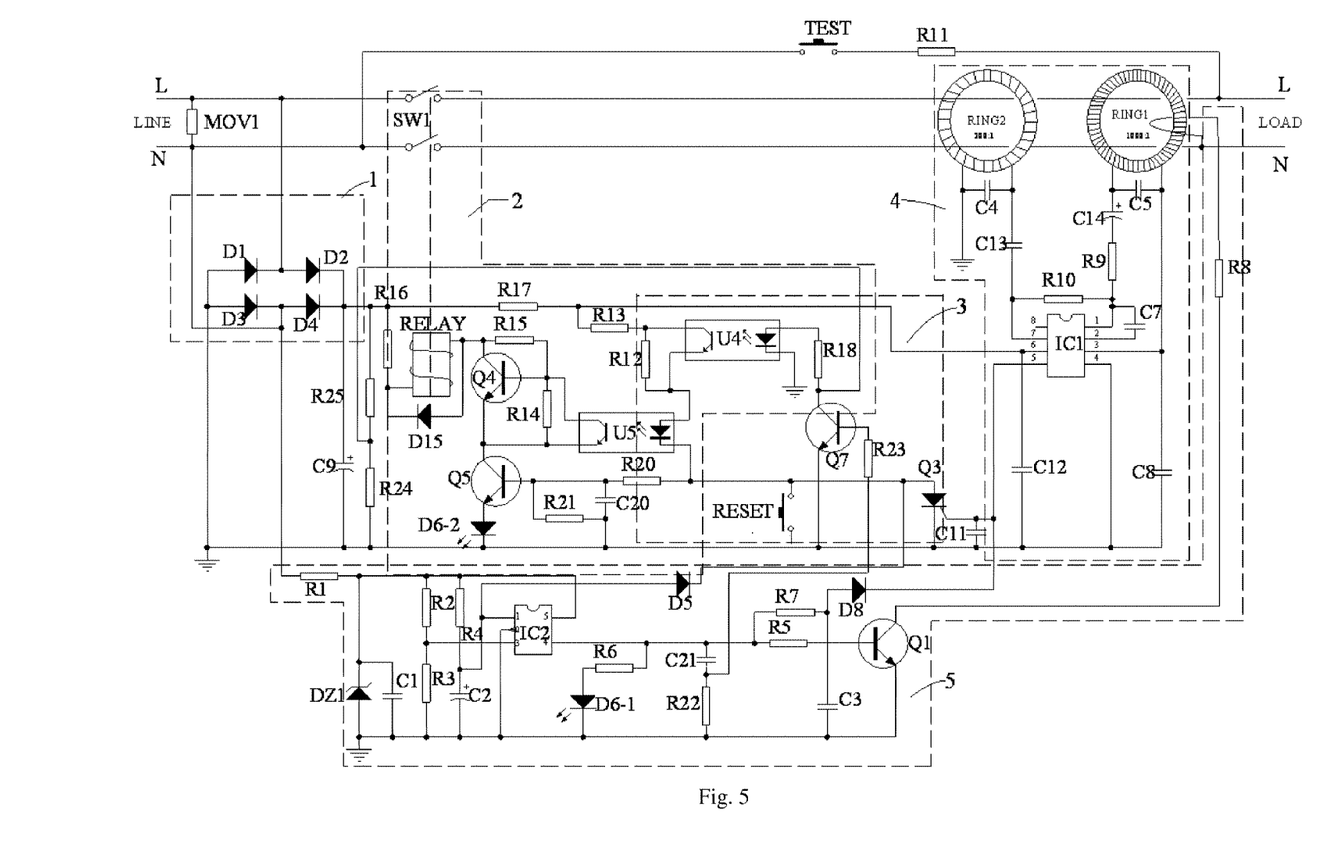
FIG. 5 is a circuit diagram of a leakage current detection device according to a fourth embodiment of the present invention.

FIG. 5 is a circuit diagram of a leakage current detection device according to a fourth embodiment of the present invention.

Compared to the embodiment of FIG. 4, in the embodiment of FIG. 5, the fifth transistor Q8 of the selection trigger unit 3 is replaced with photo-coupler U4. This improves the reliability of the device.

Also, similar to the embodiment of FIG. 4, when the reset switch is closed, the relay is energized and actuated, so the load side is connected to the line side.

In the embodiment of FIG. 5, the self-testing and leakage current detection functions as well as the normal and abnormal situations are similar to those in the embodiment of FIG. 4 and detailed descriptions are omitted here.

It will be apparent to those skilled in the art that various modification and variations can be made in the leakage current detection device of the present invention without departing from the spirit or scope of the invention. Thus, it is intended that the present invention cover modifications and variations that come within the scope of the appended claims and their equivalents.

What is claimed is:

1. A leakage current detection device connected between a power source and a load, comprising:
   a self-testing or leakage current detection selection trigger unit, for selecting a leakage current detection mode or a self-testing mode;
   a self-testing unit, for periodically generating a simulated leakage current signal in the self-testing mode; and
   a leakage current detection unit, for detecting a leakage current signal in the leakage current detection mode and detecting the simulated leakage current signal in the self-testing mode;
   wherein the selection trigger unit further causes the power source to be disconnected from the load when a leakage current signal is detected, and sends a self-testing result to the self-testing unit depending on whether the leakage current detection unit detects the simulated leakage current signal, and
   wherein the self-testing unit displays an indication of the self-testing result.

2. The leakage current detection device of claim 1, wherein the selection trigger unit includes a first silicon controlled rectifier (SCR), wherein the selection trigger unit selects the leakage current detection mode by controlling the first SCR to be conductive, and selects the self-testing mode by controlling the first SCR to be non-conductive.

3. The leakage current detection device of claim 1, wherein the selection trigger unit includes a fourth transistor and a fifth transistor, wherein the selection trigger unit selects the leakage current detection mode by controlling the fourth transistor to be non-conductive and controlling the fifth transistor to be conductive, and selects the self-testing mode by controlling the fourth transistor to be conductive and controlling the fifth transistor to be non-conductive.

4. The leakage current detection device of claim 1, wherein the selection trigger unit includes a fourth transistor and a photo-coupler, wherein the selection trigger unit selects the leakage current detection mode by controlling the fourth transistor to be non-conductive and controlling the photo-coupler to be conductive, and selects the self-testing mode by controlling the fourth transistor to be conductive and controlling the photo-coupler to be non-conductive.

5. The leakage current detection device of claim 2, wherein the selection trigger unit further includes a second SCR, wherein in the leakage current detection mode, the selection trigger unit disconnects the power source from the load by controlling the second SCR to be conductive, and in the self-testing mode, the selection trigger unit sends the self-testing result to the self-testing unit by controlling the conductive state of the second SCR.

6. The leakage current detection device of claim 1, wherein the selection trigger unit further includes a first fault indicator unit for indicating a leakage current fault condition.

7. The leakage current detection device of claim 1, wherein the self-testing unit includes:
   a reference voltage generator sub-unit for generating a reference voltage signal;
   a periodic signal generator sub-unit for generating a period voltage signal, the period voltage signal being higher than the reference voltage signal during some part of a period and lower than the reference voltage signal during some other part of the period;
   a comparator, for comparing the reference voltage signal and the periodic voltage signal; and
   a first transistor, for generating the simulated leakage current signal based on a comparison result of the comparator.

8. The leakage current detection device of claim 7, wherein the self-testing unit further includes a second fault indicator unit for indicating a malfunction condition of the leakage current detection device.

9. The leakage current detection device of claim 1, wherein the leakage current detection unit includes:
   detection coils for detecting the leakage current signal or the simulated leakage current signal; and
   a processor, for sending a detection result of the detection coils to the selection trigger unit.

10. The leakage current detection device of claim 1, further comprising:
    a power supply unit, for supplying power to the selection trigger unit, the self-testing unit, and the leakage current detection unit; and
    a relay holding unit including a relay switch, the relay holding unit keeping the relay switch closed to connect the power source to the load after the leakage current detection device is energized.

11. The leakage current detection device of claim 10, wherein the relay holding unit includes a reset switch, a second transistor, and a third transistor, wherein when the reset switch is closed, the second transistor and the third transistor are conductive to keep the relay switch closed.

12. The leakage current detection device of claim 10, wherein the relay holding unit includes a relay capacitor, a second transistor, and a third transistor, wherein after the leakage current detection device is connected to the power source, the relay capacitor keeps the second transistor and the third transistor conductive to keep the relay switch closed.

13. The leakage current detection device of claim 10, wherein the relay holding unit includes an auxiliary switch linked to the relay switch.

14. A power connection device including the leakage current detection device of claim 1.

* * * * *